US 12,555,075 B2

(12) United States Patent
Deshpande et al.

(10) Patent No.: US 12,555,075 B2
(45) Date of Patent: Feb. 17, 2026

(54) GLOBAL OPTIMIZER FOR SUPPLY CHAIN

(71) Applicant: International Business Machines Corporation, Armonk, NY (US)

(72) Inventors: Ajay A. Deshpande, White Plains, NY (US); Ali Koc, White Plains, NY (US); Ashish Jagmohan, Irvington, NY (US); Pavithra Harsha, White Plains, NY (US); Rakesh Mohan, Cortlandt Manor, NY (US); Yun Zhang, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/247,059

(22) Filed: Jan. 14, 2019

(65) Prior Publication Data

US 2020/0226546 A1    Jul. 16, 2020

(51) Int. Cl.
*G06Q 10/0875*   (2023.01)
*G06Q 10/0833*   (2023.01)

(52) U.S. Cl.
CPC ..... *G06Q 10/0875* (2013.01); *G06Q 10/0833* (2013.01); *G06Q 2220/10* (2013.01)

(58) Field of Classification Search
CPC ........... G06Q 10/0875; G06Q 10/0833; G06Q 2220/10
See application file for complete search history.

(56) References Cited

U.S. PATENT DOCUMENTS

| 6,131,087 A * | 10/2000 | Luke ................. G06Q 30/0613 705/37 |
| 9,635,000 B1 | 4/2017 | Muftic |
| 9,990,504 B1 * | 6/2018 | Chapman ............. H04W 4/023 |
| 10,319,053 B1 * | 6/2019 | Kohli ................. G06Q 10/0832 |
| 10,354,236 B1 * | 7/2019 | Wang ................. G06Q 20/0658 |
| 10,762,079 B2 | 9/2020 | Shi et al. |
| 11,018,852 B2 | 5/2021 | Chee et al. |

(Continued)

FOREIGN PATENT DOCUMENTS

| WO | 2017194815 A | 11/2017 |
| WO | 2020024607 2 | 2/2020 |

OTHER PUBLICATIONS

Tian, Feng, An information System for Food Safety Monitoring in Supply Chains based on HACCP, Blockchain and Internet of Things, Mar. 2018, ePubWU, the institutional repository of the WU Vienna University of Economics and Business, <https://epub.wu.ac.at/6090/> (Year: 2018).*

(Continued)

*Primary Examiner* — Allen C Chein
(74) *Attorney, Agent, or Firm* — CHIP LAW GROUP

(57) ABSTRACT

An example operation may include one or more of receiving supply chain states of a plurality of nodes of a supply chain, respectively, where the supply chain states have restricted visibility among the plurality of nodes, determining a modification to a supply chain state of a target node in the supply chain based on a supply chain state of at least one other node in the supply chain, transmitting the determined modification of the supply chain state to the target node, and storing a reason for modifying the supply chain state of the target node via a block included among a hash-linked chain of blocks.

15 Claims, 13 Drawing Sheets

(56) References Cited

U.S. PATENT DOCUMENTS

| | | | | |
|---|---|---|---|---|
| 2014/0379509 | A1* | 12/2014 | Sasa | G06Q 30/0605 |
| | | | | 705/26.2 |
| 2015/0046363 | A1* | 2/2015 | McNamara | G06Q 10/0833 |
| | | | | 705/333 |
| 2015/0073929 | A1* | 3/2015 | Psota | G06Q 30/0605 |
| | | | | 705/26.2 |
| 2016/0292672 | A1 | 10/2016 | Fay et al. | |
| 2016/0365978 | A1 | 12/2016 | Ganesan et al. | |
| 2017/0039500 | A1* | 2/2017 | Leidner | G06Q 10/0833 |
| 2017/0116693 | A1 | 4/2017 | Rae et al. | |
| 2017/0262862 | A1* | 9/2017 | Aljawhari | G06F 16/90335 |
| 2018/0068091 | A1 | 3/2018 | Gaidar et al. | |
| 2018/0089256 | A1 | 3/2018 | Wright | |
| 2018/0167217 | A1 | 6/2018 | Brady et al. | |
| 2018/0285810 | A1* | 10/2018 | Ramachandran | G06Q 30/04 |
| 2018/0322259 | A1 | 11/2018 | Solow et al. | |
| 2019/0139047 | A1 | 5/2019 | Rønnow et al. | |
| 2019/0228388 | A1 | 7/2019 | Hu et al. | |
| 2019/0228391 | A1 | 7/2019 | Hu et al. | |
| 2019/0306549 | A1 | 10/2019 | Dietz et al. | |
| 2019/0335715 | A1* | 11/2019 | Hicks | G06Q 50/02 |
| 2019/0358515 | A1* | 11/2019 | Tran | H04L 9/3236 |
| 2019/0370798 | A1 | 12/2019 | Hu et al. | |
| 2020/0005299 | A1 | 1/2020 | Castinado et al. | |
| 2020/0042615 | A1 | 2/2020 | Boudville | |
| 2020/0052883 | A1* | 2/2020 | Dender | H04L 63/126 |
| 2020/0133921 | A1 | 4/2020 | Lee et al. | |
| 2020/0202014 | A1 | 6/2020 | Xu et al. | |
| 2020/0202021 | A1 | 6/2020 | Chee et al. | |
| 2020/0226546 | A1 | 7/2020 | Deshpande et al. | |
| 2020/0380508 | A1 | 12/2020 | Sheriff | |

OTHER PUBLICATIONS

Narayanaswami et al. Blockchain anchored supply chain automation, Feb. 2019, IBM J. Res. & Dev., vol. 63, No. 2/3, Paper 7, pp. 1-11 (Year: 2019).*

Nakamoto, "Bitcoin: A Peer-to-Peer Electronic Cash System", 2008, available at https://www.modeapp.com/bitcoin-whitepaper (Year: 2008).*

"Hyperledger Fabric—Introduction", Nov. 2017, available at https://web.archive.org/web/20171129040318/http://hyperledger-fabric.readthedocs.io/en/latest/blockchain.html (Year: 2017).*

"Hyperledger Fabric—Endorsement policies", Nov. 2017, available at https://web.archive.org/web/20171210225046/http://hyperledger-fabric.readthedocs.io/en/latest/endorsement-policies.html (Year: 2017).*

Zhu Zhu , "An Integrated Contract Strategy in a Three-Echelon Supply Chain with Capacity Limitation under the Forecast Update", 2008, https://ieeexplore.ieee.org/document/4737727 (Year: 2008).*

"Hyperledger Fabric FAQ", https://web.archive.org/web/20171127124936/http://hyperledger-fabric.readthedocs.io/en/latest/Fabric-FAQ.html (Year: 2017).*

Engelenburg, "A Blockchain Architecture for Reducing the Bullwhip Effect", 2018, https://research.tudelft.nl/files/85676845/Engelenburg2018_Chapter_ABlockchainArchitectureForRedu.pdf (Year: 2018).*

Shengnan Zhao , "Integrated Energy Transaction Mechanisms Based on Blockchain Technology", 2018, available at https://www.mdpi.com/1996-1073/11/9/2412 (Year: 2018).*

Hogan Lovells, "A guide to blockchain and data protection", Nov. 2018, available at https://engagepremium.hoganlovells.com/resources/blockchain/insight/a-guide-to-blockchain-and-data-protection (Year: 2018).* https://etherworld.co/2017/09/18/smart-contract-an-introduction/ (Year: 2017).*

Central Limit Order Book, 2014, https://web.archive.org/web/20140204141844/https://en.wikipedia.org/wiki/Central_limit_order_book). (Year: 2014).*

List of IBM Patents or Patent Applications Treated as Related, Jan. 15, 2019.

Yi-Min Chee et al., "Blockchain Trust Anchor", U.S. Appl. No. 16/230,212, filed Dec. 21, 2018.

Yi-Min Chee et al., "Dynamic Entitlement for Blockchain Data", U.S. Appl. No. 16/230,426, filed Dec. 21, 2018.

Ajay A. Deshpande et al., "Global Optimizer for Supply Chain", U.S. Appl. No. 16/247,059, filed Jan. 14, 2019.

Cachon et al., "Supply Chain Inventory Management and the Value of Shared Information", Management Science © 2000 Informs vol. 46, No. 8, Aug. 2000 pp. 1032-1048.

Chen et al., "Lower Bounds for Multi-echelon Stochastic Inventory Systems", Management Science/vol. 40, No. 11, Nov. 1994, 18 pages.

Chen, "Echelon Reorder Points, Installation Reorder Points, and the Value of Centralized Demand Information", Management Science 44(12-part-2), 1998, pp. S221-S234.

Clark et al., "Optimal Policies for a Multi-Echelon Inventory Problem", Management science, vol. 6, No. 4, 1960, 16 pages.

Clark, "A dynamic, single-item, multi-echelon inventory model", RM-2297US Air Force Project Rand, Research Memorandum, 1958, 44 pages.

Dong et al., "Optimal Policies and Approximations for a Serial Multi-Echelon Inventory System with Time-correlated Demand", Operations research, vol. 51, No. 6, 2003, 59 pages.

Federgruen et al., "Allocation Policies and Cost Approximations for Multilocation Inventory Systems", Naval Research Logistics Quarterly, vol. 31, No. 1, 1984, pp. 97-129.

Federgruen et al., "Approximations of dynamic, multilocation production and inventory problems", Management Science, vol. 30, No. 1, 1984, pp. 69-84.

Federgruen et al., "Capacitated Multi-Item Inventory Systems with Random and Seasonally Fluctuating Demands: Implications for Postponement Strategies", Management Science, vol. 47, No. 4, 2001, pp. 512-531.

Gavirneni et al., "Value of information in capacitated supply chains", Management science, vol. 45, No. 1, 1999, 32 pages.

Lee et al., "Information sharing in a supply chain", International journal of manufacturing technology and management, vol. 1, No. 1, 2000, pp. 79-93.

Levi et al., "The Value of Information Sharing in a Two-Stage Supply Chain with Production Capacity Constraints", Wiley Periodicals, Inc., 2003, 29 pages.

* cited by examiner

GLOBAL OPTIMIZER FOR SUPPLY CHAIN

TECHNICAL FIELD

This application generally relates to a process performed via a blockchain, and more particularly, to an optimization system that can recommend inventory settings to participants of a supply chain without disclosing sensitive inventory information and while leaving an auditable trail of reasons for the recommend inventory settings.

BACKGROUND

A centralized database stores and maintains data at one location. This location is often a central computing system such as a server or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, if a set of data is unexpectedly lost it can be difficult to retrieve other than through manual operation from back-up disk storage.

Centralized databases are frequently used for storing supply chain data. Supply chains, however, face limitations when storing data because participants to the supply chain do not necessarily trust one another and may even be competitors. As a result, an individual participant may have limited visibility into the supply and demand of other participants in the supply chain. Therefore, participants must make a best guess (e.g., seasonal patterns, recent trends, etc.) as to the supply of upstream nodes and the demand of downstream nodes in the supply chain. This can lead to spoilage (waste) of goods when there supply outweighs demand and lost sales when demand outweighs supply. Accordingly, a mechanism is needed for optimizing supply chains.

SUMMARY

One example embodiment may provide a system that includes one or more of a network interface configured to receive supply chain states of a plurality of nodes of a supply chain, respectively, where the supply chain states have restricted visibility among the plurality of nodes, a processor configured to determine a modification to a supply chain state of a target node in the supply chain based on a supply chain state of at least one other node in the supply chain, and control the network interface to transmit the determined modification of the supply chain state to the target node, wherein the processor is further configured to store a reason for modification to the supply chain state of the target node via a block included among a hash-linked chain of blocks.

Another example embodiment may provide a method that includes one or more of receiving supply chain states of a plurality of nodes of a supply chain, respectively, where the supply chain states have restricted visibility among the plurality of nodes, determining a modification to a supply chain state of a target node in the supply chain based on a supply chain state of at least one other node in the supply chain, transmitting the determined modification of the supply chain state to the target node, and storing a reason for modifying the supply chain state of the target node via a block included among a hash-linked chain of blocks.

Another example embodiment may provide a non-transitory computer readable medium comprising instructions, that when read by a processor, cause the processor to perform one or more of receiving supply chain states of a plurality of nodes of a supply chain, respectively, where the supply chain states have restricted visibility among the plurality of nodes, determining a modification to a supply chain state of a target node in the supply chain based on a supply chain state of at least one other node in the supply chain, transmitting the determined modification of the supply chain state to the target node, and storing a reason for modifying the supply chain state of the target node via a block included among a hash-linked chain of blocks.

DETAILED DESCRIPTION

Figure 1:
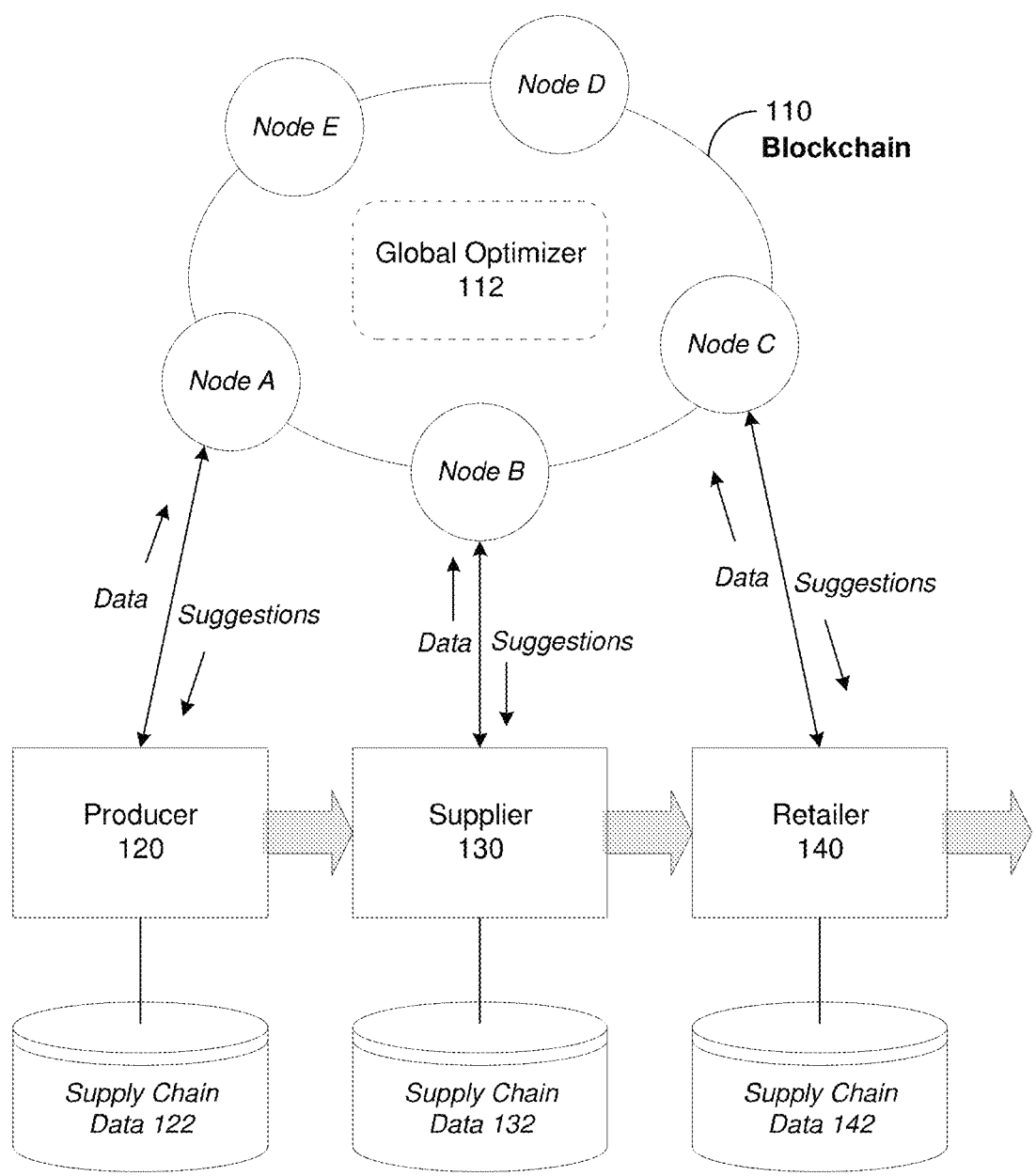
FIG. 1 is a diagram illustrating a global optimization blockchain network for a supply chain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which are directed to a global optimizer for supply chain that can provide optimum inventory suggestions based on a global view of participant supply and demand across the supply chain.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Related supply chain networks suffer inefficiencies in ordering/replenishment decision making due to limited visibility and coordination among participants in the supply chain. The reason for such limited visibility is that oftentimes participants are competitors. Therefore, participants primarily have visibility into their own demand and inventory positions. In some cases, a participant may have limited visibility into one-up/one-down partners, and typically zero visibility beyond that. As a result, each participant attempts to make locally optimized ordering decisions based on a limited view of the supply chain needs as a whole. The result is inefficient over-ordering which grows worse with multiple tiers due to bull-whip type effects. This can also lead to losses especially for perishable items which are the subject of the supply chains, where over-ordering directly leads to spoilage and poor freshness.

The example embodiments overcome these drawbacks by providing a global optimizer which may be implemented through blockchain and which provides suggestions to participants of a supply chain on supplies to order, inventory to transfer, and the like. based on a global view of other participants in the supply chain but without divulging personal/confidential data of the different participants to one another. According to various aspects, the suggestions provided by optimizer may be "optimal" in the sense of providing tighter inventory control across participants of the supply chain, reduced spoilage and increased freshness leading to overall mitigation of uncertainties. The example embodiments also provide additional benefits enabled by blockchain smart contracts which can leave an auditable trail via an immutable ledger which can provide proof to the participants as to why the optimizer made a recommendation to a particular node (participant).

The system uses visibility (by the global optimizer) across participants to improve decision making the supply chain. Specific types of information the optimizer may be looking at is ordering and replenishment on a node-by-node (e.g., participant-by-participant) basis. This prevents inventory from becoming too much or getting too low at each participant while restricting a view of each participants sensitive data to the global optimizer and any additional nodes of the supply chain they choose. By implementing these decisions using a prior agreed smart contract on the blockchain, the system guarantees trust among parties via an auditable trail that is immutable. The smart contract and the blockchain track all of this.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

According to various aspects, inherent blockchain attributes such as smart contract (global optimizer) and immutable storage (blockchain ledger) are used to implement the technical effect. The global optimizer smart contract may execute on any of a plurality of peer nodes among a blockchain network, and the supply chain nodes (participants) may be off-chain and may interact with any of the peer nodes to gain access to the blockchain network (and the global optimization).

The global optimizer may be implemented without a blockchain and just have global optimization. Instead of storing data via an immutable record that is distributed across a plurality of nodes (which require endorsement and consensus), the data would be stored in a common database. The blockchain provides a key benefit of immutability, however. The optimizer is making business decisions (which can be questioned later on). Therefore, it is beneficial for the decision making logic to be endorsed (commonly agreed) by all the participants. It is also important that the global optimizer track its reasoning for making such decision via an immutable record so that if someone later has questions for why a decision was made there is an immutable record.

FIG. 1 illustrates a global optimization network 100 for a supply chain according to example embodiments. Referring to FIG. 1, a global optimizer 112 is implemented by nodes of a blockchain 110. Here, the nodes may be blockchain peer nodes A-E which execute a global optimization smart contract. The peer nodes may include servers, cloud instances, databases, personal computers, and/or the like. The network 100 also includes a supply chain of participants. For convenience of description, the supply chain in this example includes a producer 120, a supplier 130, and a retailer 140, however, embodiments are not limited thereto. In some cases, supply chains may include different entities, more entities, etc. Each participant (e.g., 120 130, and 140) may be associated with or may otherwise manage one or more nodes such as desktop computers, servers, databases, mobile devices, or the like. To interact with the global optimizer 112, a supply chain participant's node may communicate with a blockchain peer node (e.g., nodes A-E) included in the blockchain 100.

The network 100 provides a blockchain-based solution (global optimizer 112) to provide end-to-end data sharing, and coordinated ordering and decision-making via smart contracts. The global optimizer 112 may receive supply chain data (e.g., supply chain data 122, 132, 142, etc.) stored by the participants 120, 130, and 140, respectively. The supply chain data may include a current inventory of a product, goods, items, etc., a current demand of the inventory, a level of freshness of the inventory, an expected (future) demand of the inventory, and the like. The inventory data may include information about products, goods, items, etc., which the supply chain participants jointly produce and sell. Non-limiting examples include automobiles, food, consumer electronics, clothing, healthcare equipment, and the like.

Here, the supply chain data of each participant 120, 130, and 140 does not need to be shared among the other themselves. Therefore, sensitive information can remain restricted or limited in visibility to the global optimizer 112. The global optimizer 112 may receive the supply chain data 122, 132, and 142, and determine optimal changes or inventory settings for each of the respective participants based on a global view of the participant supply chain data.

As an example, the producer 120 may be a farmer growing strawberries. The supplier 130 may obtain a bulk of supply of strawberries periodically from the farmer (producer 120) and store them in a cold environment to avoid spoilage. The retailer 140 in this example, may obtain a bulk of strawberries from the supplier 130 to satisfy end customer demand in its retailer stores. In this example, each of the producer 120, the supplier 130, and the retailer 140 may upload similar supply chain state information. The farmer (producer 120) may upload information periodically on its stock of strawberries and their expiration date by each batch. The supplier 130 may do the same. The retailer 140 may additionally specify the demand (in terms of sales) for strawberries. Additionally the retailer 140 may specify the expected demand in future. Also, there is information specification on lead times for strawberries to arrive from one party to another after order specification.

The global optimizer 112 can make recommendations to each of the participants about changes in inventory. The global optimizer 112 provides coordinated globally optimized ordering and replenishment based on a common view across supply-chain of demand, inventory, freshness and shelf-lives. For example, for each participant (e.g., producer 120, supplier 130, and retailer 140) the global optimizer 112 may suggest how much inventory of of an item to order from an upstream participant and how much inventory to be transferred to a downstream participant at pre-decided cadence. The global optimizer 112 may be based on objective functions which attempt to minimize overall inventory level, minimize the amount of inventory spoiled, and maximize freshness (or minimize the average age of the inventory present in the system). The algorithm containing the overall objective may be formulated as a weighted combination of each of these three objectives.

The global optimizer 112 may perform limited data sharing and coordinated decision making on ordering and replenishment to thereby mitigate uncertainties to some degree without divulging sensitive inventory information of competitor/untrusting parties in the supply chain. The global optimizer 112 can create tighter inventory control across all participants and significantly reduced spoilage and increase freshness. As further described in the example of FIG. 4, the global optimizer 112 may further implement an echelon policy which allows coordination among a subset of supply chain participants by enabling some participants to see into the inventory of other participants in a limited and an agreed upon manner. The global optimizer 112 results in significant improvements in supply-chain efficiencies including, but not limited to, reduction in spoilage and maximizing freshness of items while minimizing demand loss due to stockouts.

Furthermore, by implementing the global optimizer 112 as a smart contract via a blockchain, the global optimizer 112 can enable globally coordinated decision making using a specification that is an a-priori agreed global ordering/replenishment framework which the participants have previously agreed upon, and the global optimizer 112 can create an audit trail of suggested ordering/replenishment actions and why those actions were recommended. For example, the global optimizer 112 may store a reason for making a suggestion to increase or decrease inventory at a target node of the supply chain. The reasons may include specific supply and/or demand parameters at other nodes in the supply chain. The supply and/or demand parameters may include current inventory levels, freshness levels, expected demand, etc., which may not be known to the target node, but which may be visible to the global optimizer 112. By storing the reasons for making a recommendation to the target node, the global optimizer 112 can provide auditable proof (at a later time) should the decision making come under question.

The global optimizer may store supply chain data via data blocks on the blockchain 100. The supply chain data may include inventory information, supply information, demand information, freshness, and the like, of inventory at any of the supply chain participants. The global optimizer may also store reasoning for making recommendations as well as the recommendations themselves via a data blocks on the blockchain.

Figure 2A:
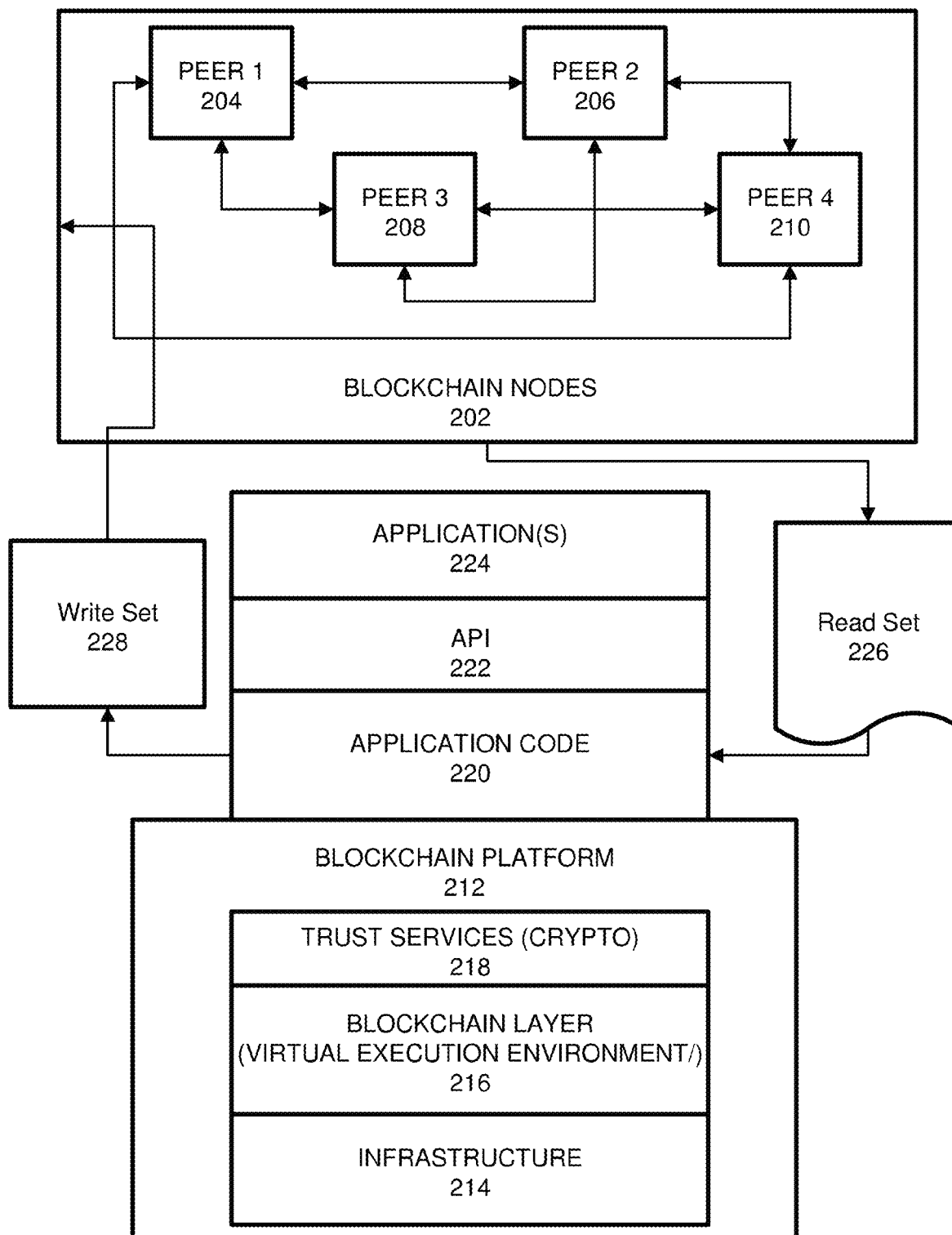
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on an endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. According to various embodiments, smart contracts may be created to execute a global optimizer. The smart contracts can themselves be used to identify rules associated with authorization and access requirements and usage of the ledger. In this example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract (e.g., global optimizer, etc.) may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
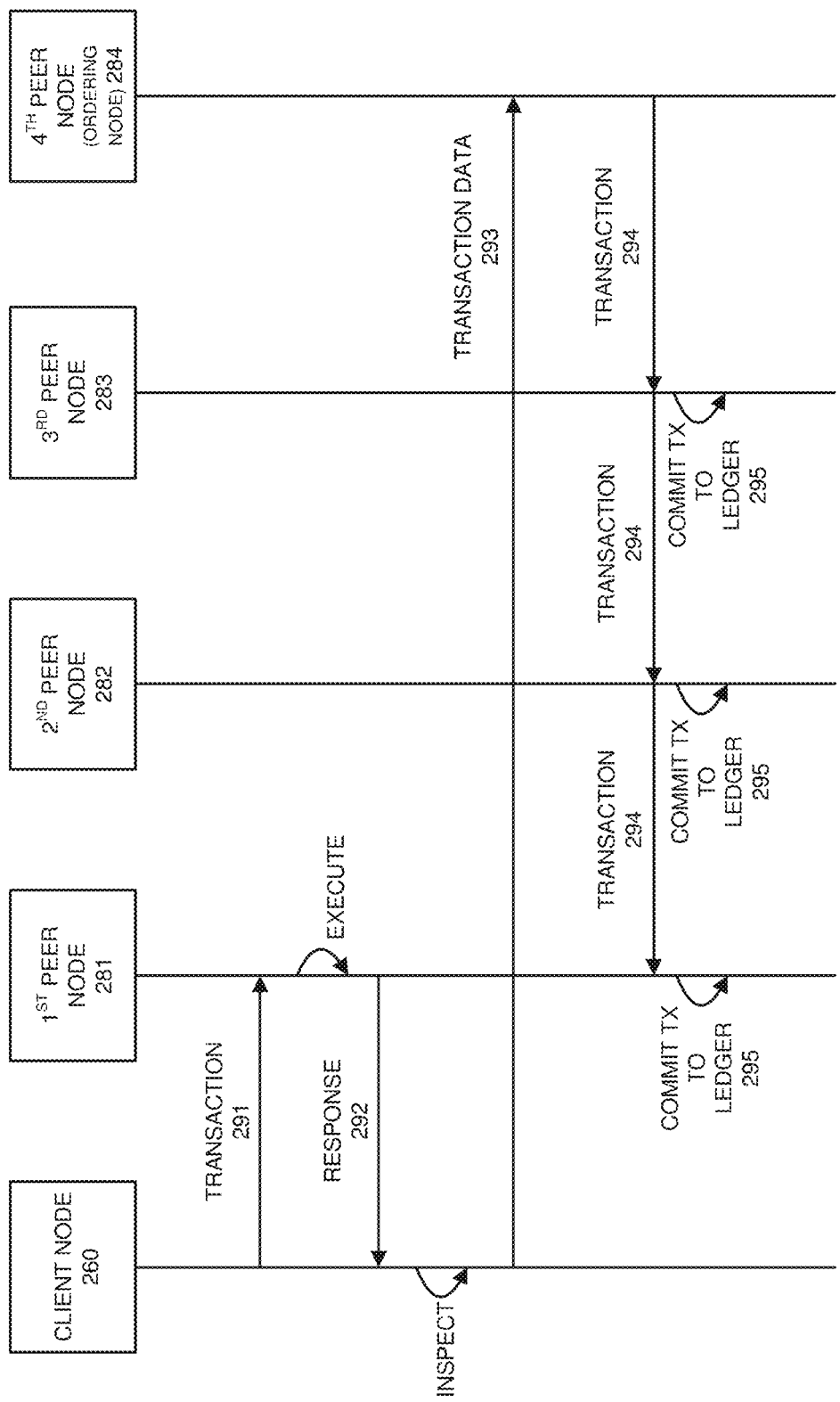
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. In the example embodiments, a client node 260 may be a supply chain participant such as participants 120-140 in FIG. 1. The transaction proposal 291 may include a request to store information about execution results of a sub-component of a software model. There may be more than one endorser, but one is shown here for convenience (i.e., peer node 281). The client 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. According to various embodiments, the transaction results may include a result of executing a current step of the multi-party process. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
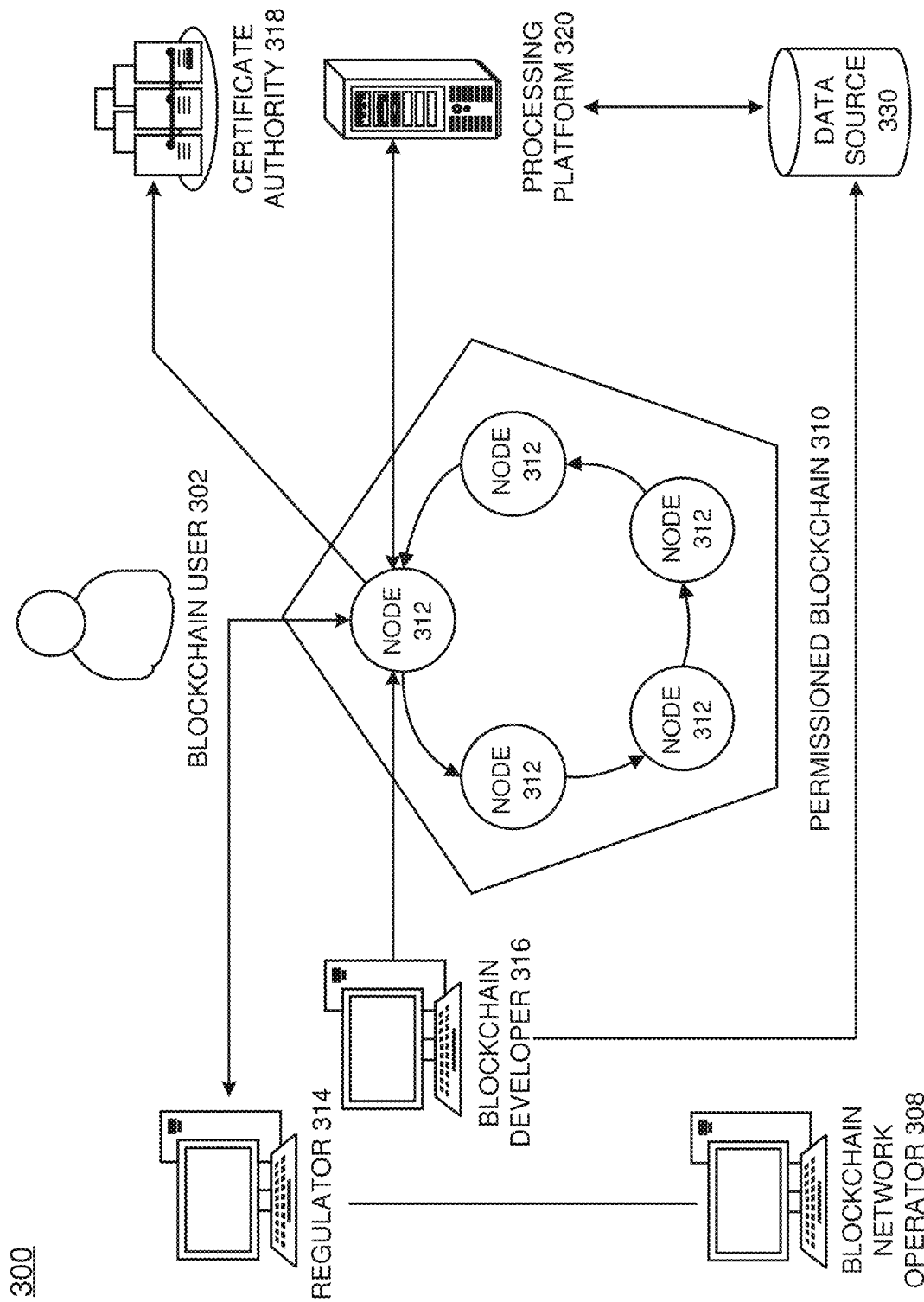
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
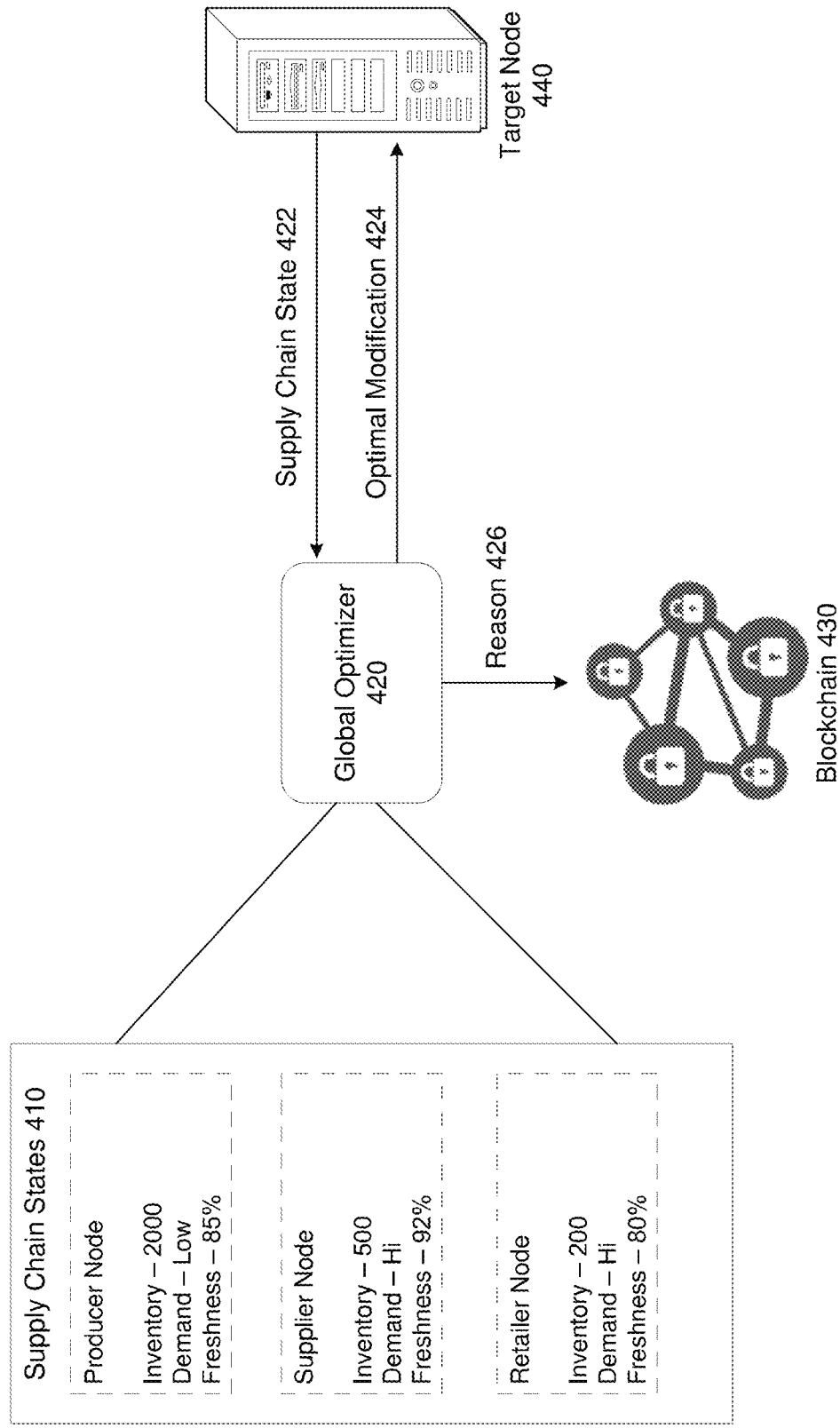
FIG. 4 is a diagram illustrating a process of recommending optimal modifications to an inventory of a target node according to example embodiments.

FIG. 4 illustrates a process 400 of a global optimizer 420 recommending optimal modifications to an inventory of a target node 420 according to example embodiments. Here, the target node 420 may be a node that is associated with a participant in a supply chain (e.g., manufacturer, producer, supplier, distributor, retailer, etc.). In this example, the global optimizer 420 receives supply chain data 410 which is input from the different participants of the supply. In the example of FIG. 4, the target node 420 provide its supply chain state to the global optimizer 420 via a message 422.

As an example, the supply chain data 410 may include one or more of a supply chain network configuration (e.g., serial type with multiple depths, fan-out type at the end retailer nodes, and the like), lead times at various junctures in the supply chain (e.g., delays, latency values, etc.), a product shelf life of the item being produced and sold by the supply chain, detailed knowledge of the inventory state in the system at various stages (in-transit as well as on-hand in various nodes), predicted demand at the end consumption nodes in the next few time periods, weights of individual objective functions in the overall objective function service level agreement (SLA) in terms of demand loss tolerance level, and the like.

In response, the global optimizer 420 may determine a modification to a supply chain state for each of the nodes in the supply chain (including target node 420). To determine each state, the global optimizer may implement an algorithm which is based on a weighted combination of minimizing total inventory, minimizing waste due to spoilage, and maximizing product freshness. Based on the objective function, the global optimizer 420 may determine outputs for each of the nodes (including the target node 420). Here, the outputs may include one or more of optimal inventory levels for each participant (which indicates how much inventory needs to be transited from one block to another), pareto-frontiers in terms of waste vs. demand lost, freshness vs. waste and freshness vs. demand lost, and the like. As another example, if the user has selected SLA in terms of demand loss, then the global optimizer 420 may generate direct optimal output for that setting, and the like. In FIG. 4, the global optimizer 420 outputs the determined optimal settings for the target node 440 in a message 424.

In addition, the global optimizer 420 may store the reason 426 for the suggested optimization of the supply chain state of the target node 440 in a data block of a blockchain 430. For example, the reason 426 may include supply chain states of other nodes in the supply chain that are affecting the supply/demand of the target node 440, and which may not be visible to the target node 440. Therefore, the global optimizer 420 can create an auditable trail behind why it made recommendations to each node, which can subsequently be verified by an auditor, etc.

In some embodiments, the global optimizer may implement an echelon policy. In this example, a group of consecutive participants/stages in a supply chain agree on information sharing, where the uppermost node in the group implements a centralized echelon policy, and all others still implement their own preferred inventory policies. In this example, the node that implements echelon policy has the full visibility to all inventory positions in the group, to the order history of the lowermost node(s) (i.e., to the demand information if retailers participate), and to the inventory policy of the lowermost node(s). In some embodiments, the node that implements echelon policy predicts how much order would propagate from the lowermost nodes (i.e., demand from the retailer customers, if retailers participate) and sets its base-stock level accordingly. The echelon policy may be most effective when the upper stream nodes in the network participates. Another example is fully echelon in which all nodes in the network participate. This has the highest gain over decentralized.

Figure 5:
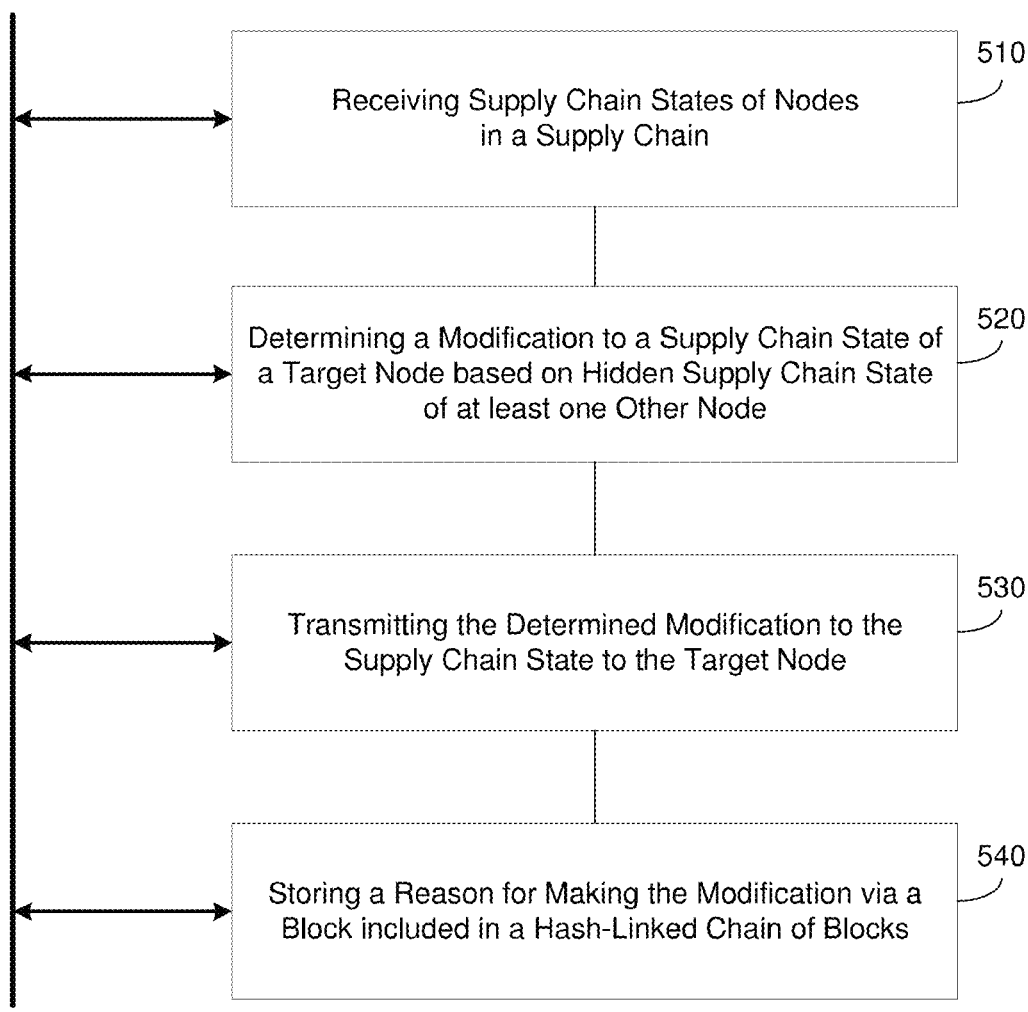
FIG. 5 is a diagram illustrating a method of recommending modification of a supply chain state of a target node according to example embodiments.

FIG. 5 illustrates a method 500 of recommending modification of a supply chain state of a target node according to example embodiments. For example, the method 500 may be performed by a blockchain peer node that may be a computing system. As another example, the method 500 may be performed by an off-chain system such as a server, a database, a user device, a combination of devices, and the like. In some embodiments, the method 500 may be performed by a combination of any of the systems. The target node in this example may be associated with a participant in the supply chain (e.g., manufacturer, producer, distributor, retailer, etc.).

Referring to FIG. 5, in 510, the method may include receiving supply chain states of a plurality of nodes of a supply chain, respectively, where the supply chain states have restricted visibility among the plurality of nodes. The supply chain states may provide information about one or more of a current supply of items associated with the node, a freshness of the supply, and an expected demand for the supply. The supply chain state information may be limited in view to other participants and may only be visible to the global optimizer and/or any other participants given express authorization.

In 520, the method may include determining a modification to a supply chain state of a target node in the supply chain based on a supply chain state of at least one other node in the supply chain. Furthermore, in 530, the method may include transmitting the determined modification of the supply chain state to the target node, and in 540, storing a reason for modifying the supply chain state of the target node via a block included among a hash-linked chain of blocks. According to various embodiments, the determining to modify the supply chain state of the target node in 520 may be based on a weighted combination of a minimization of global inventory, minimization of waste due to spoilage, and maximization of freshness.

In some embodiments, the determining to modify the supply chain state of the target node is further based on a network configuration of the plurality of nodes in the supply chain. In some embodiments, the determining to modify the supply chain state of the target node is further based on a shelf life of inventory at the at least one other node in the supply chain and latency values at one or more locations in the supply chain. In some embodiments, the storing may include storing supply chain states of at least one other node which is not visible to the target node and which is a basis of the determined modification of the supply chain state of the target node. In some embodiments, the determined modification may include a suggested inventory to request from an upstream node in the supply chain and a suggested inventory to be transferred to a downstream node in the supply chain. In some embodiments, the method may further include the global optimizer granting access of supply chain states of a group of nodes in the supply chain to the target node when the group of nodes and the target node are included within a pre-agreed upon echelon policy. In some embodiments, a global view of the supply chain states among the nodes may be shared in a controlled manner with the nodes without revealing (i.e., keeping hidden) specific sensitive supply, demand, statistics, etc. of a supply chain node to the other nodes. For example, the global optimizer may reveal a partial view of supply state information of a group of nodes (e.g., an aggregate, etc.) without revealing actual statistics for supply, demand, etc., of an individual node in the supply chain.

Figure 6A:
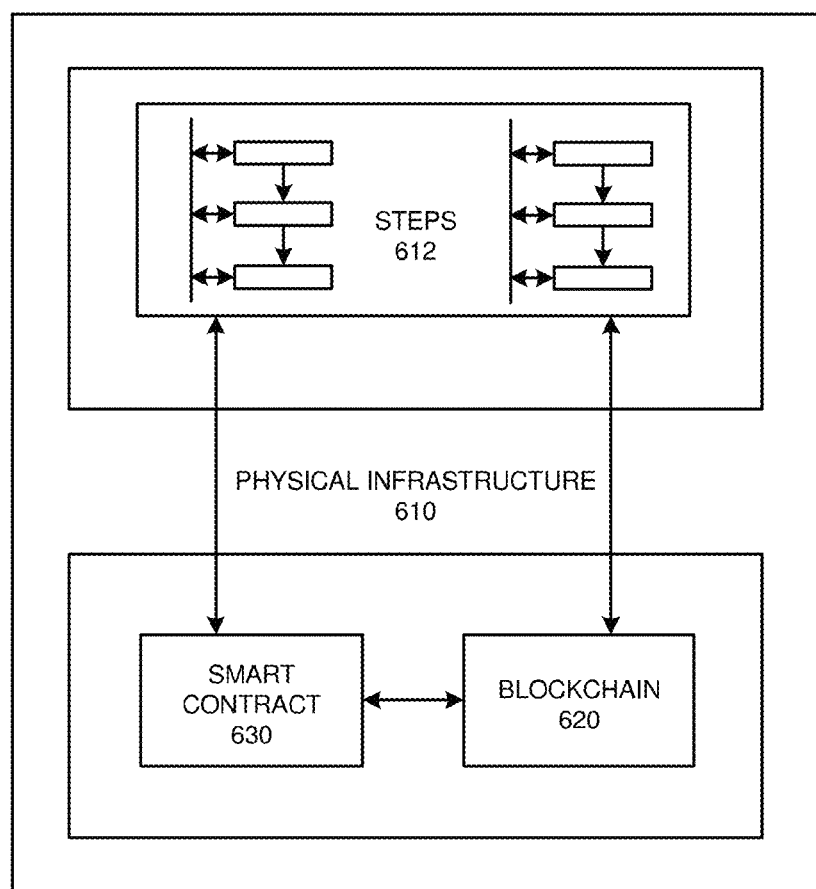
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. For example, the smart contract 630 may implement the functions of the global optimizer as described herein. The steps 612 may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
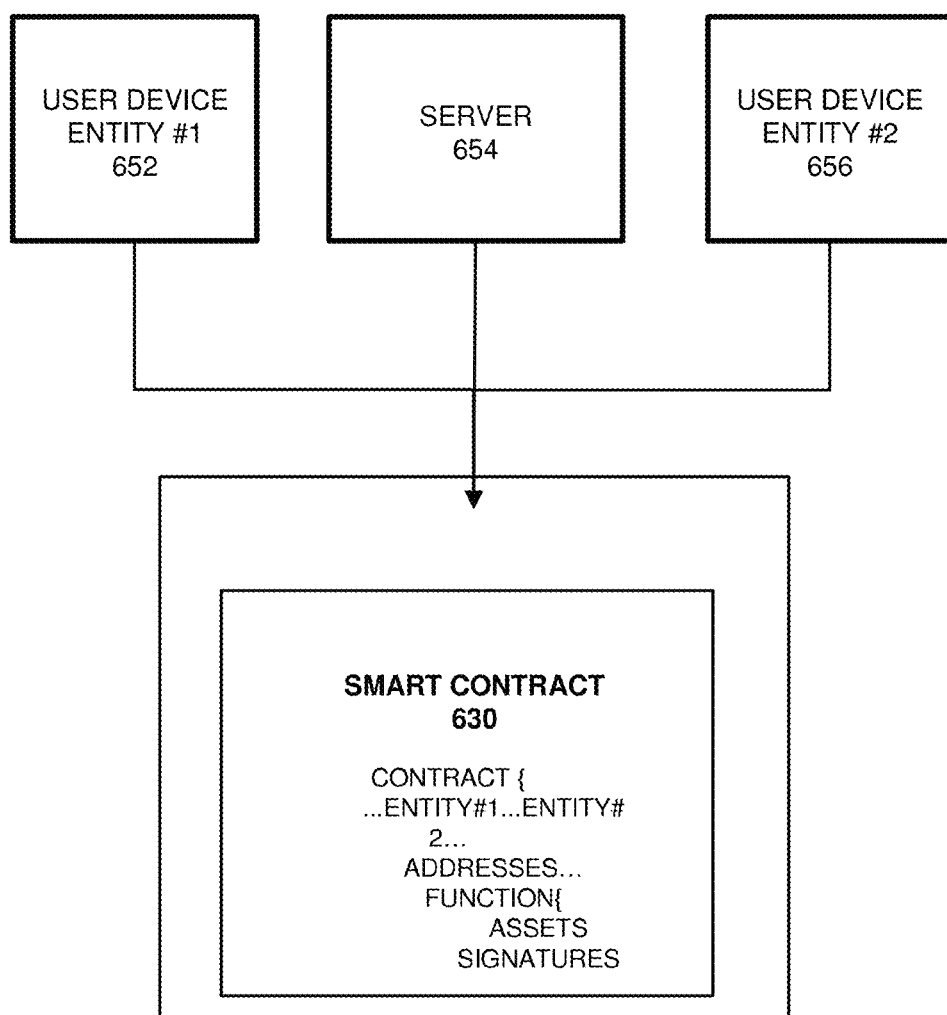
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
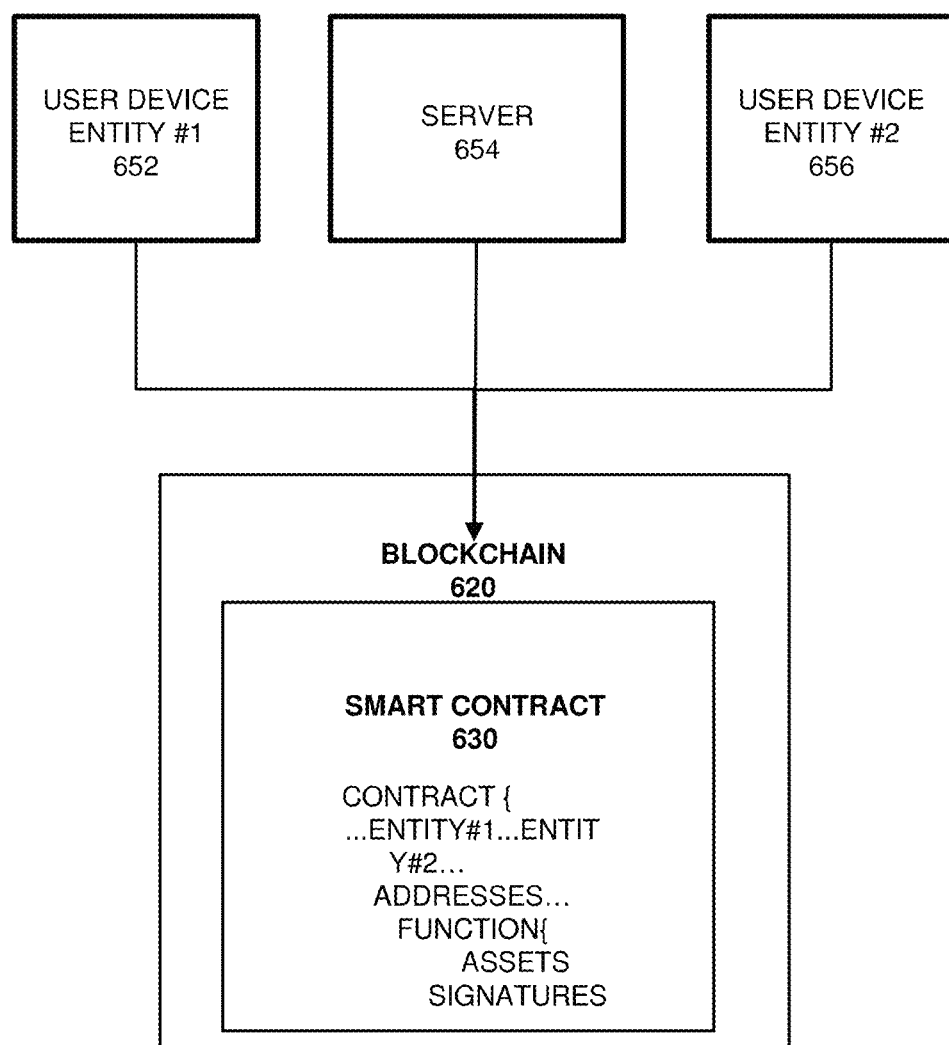
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
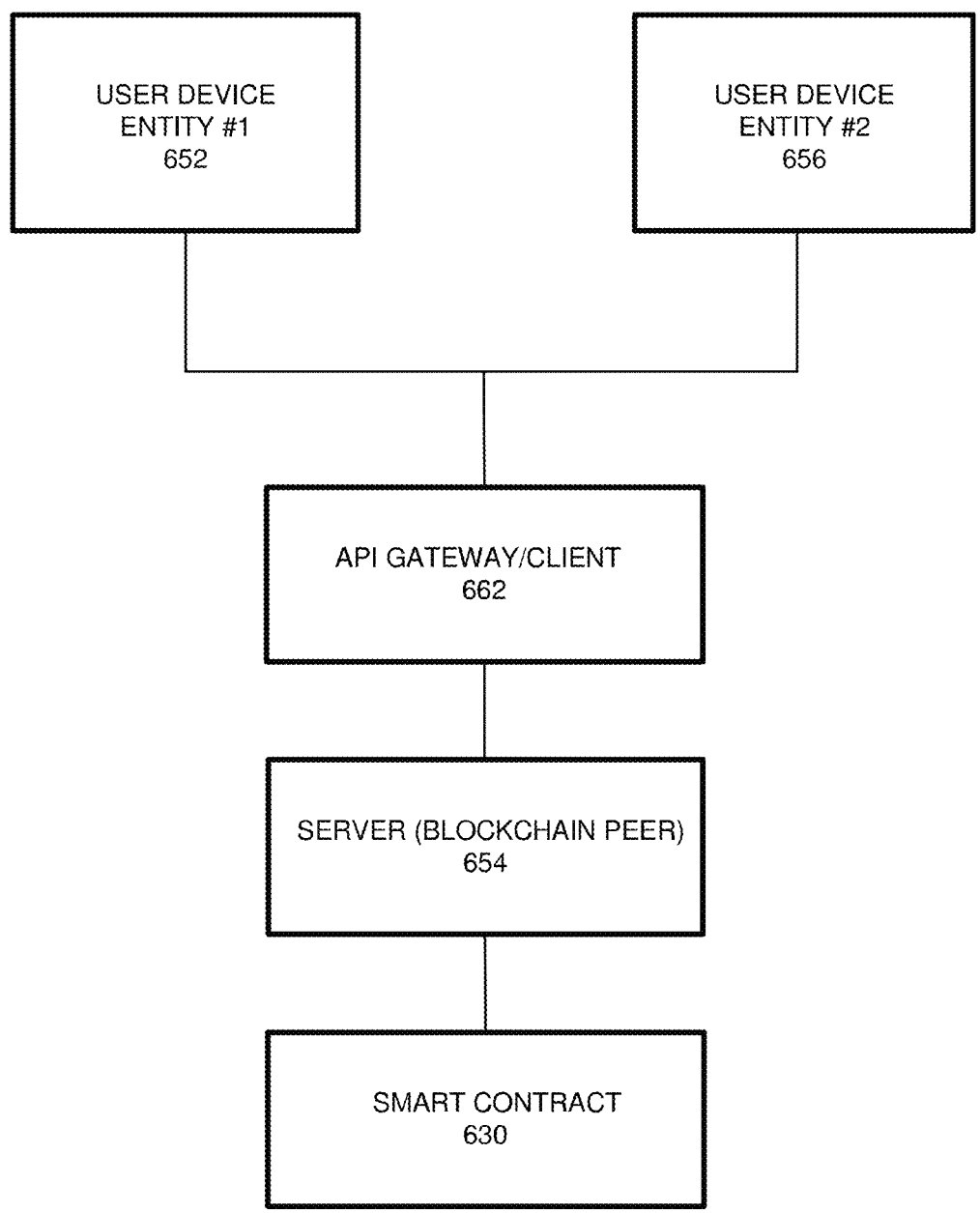
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7A:
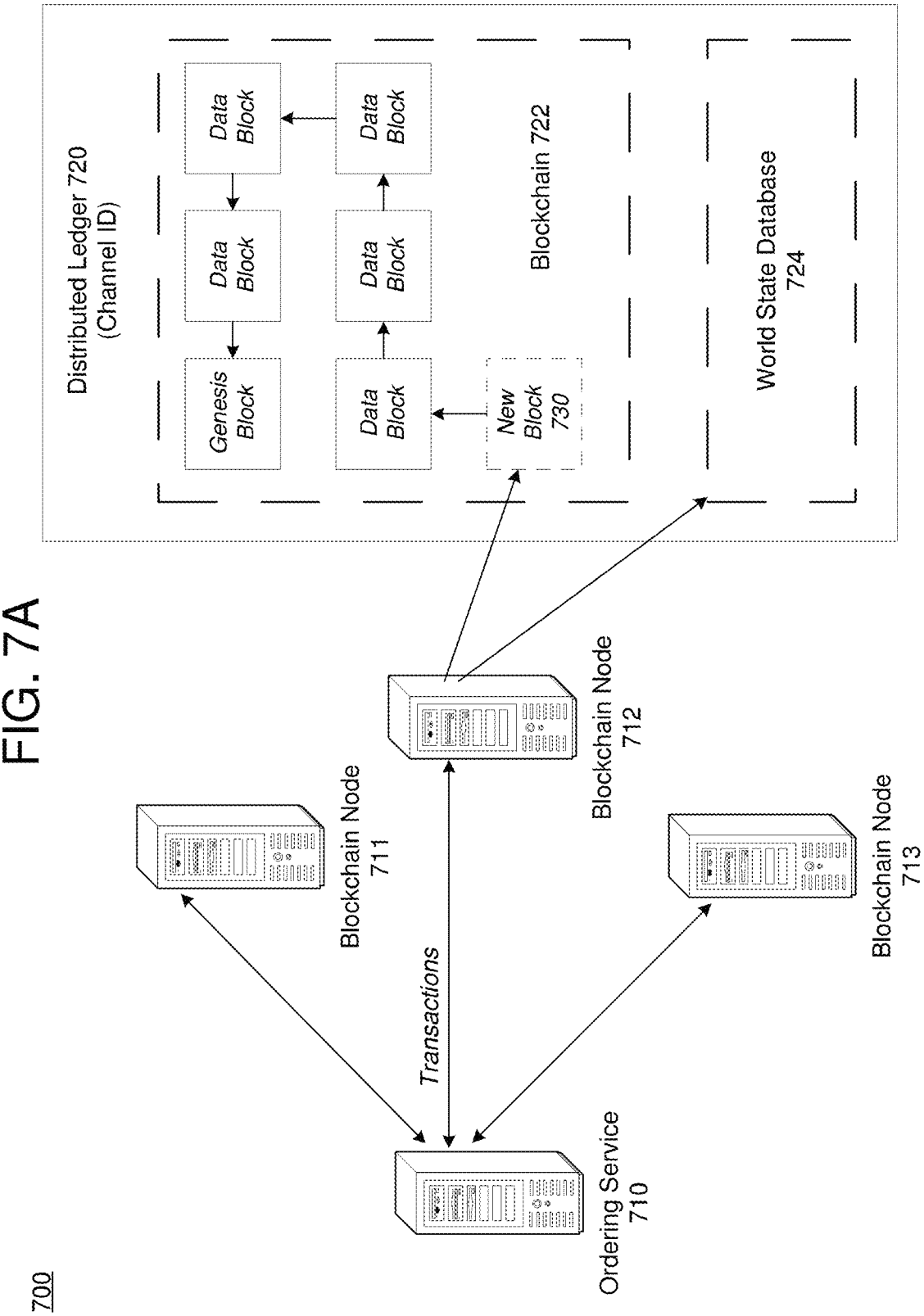
FIG. 7A is a diagram illustrating a process of a new block being added to a blockchain ledger, according to example embodiments.
Figure 7B:
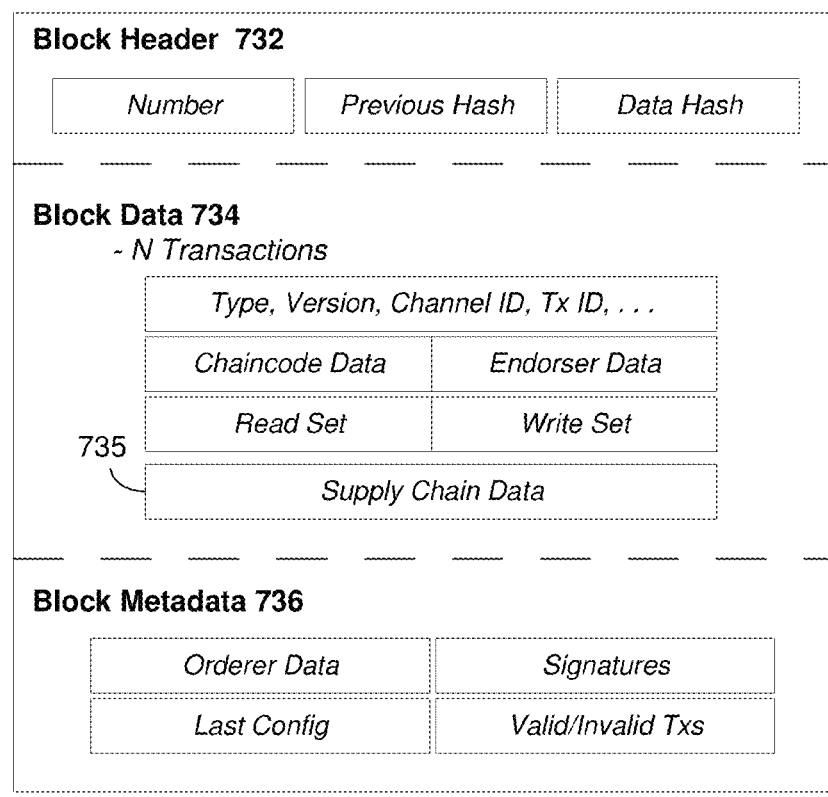
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, in addition to traditional blockchain-based information, the block data 734 may also store supply chain data 735 that includes inventory information of participants, supply, demand (current and expected), freshness, and the like. The supply chain data 735 may also include reasons for making recommendations to participants in the supply chain to change their inventory settings. The reasons stored in the supply chain data 735 may be determined based on an endorsement policy implemented by nodes of the blockchain and stored within the blockchain when a predetermined number of nodes have endorsed the reasoning 735.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
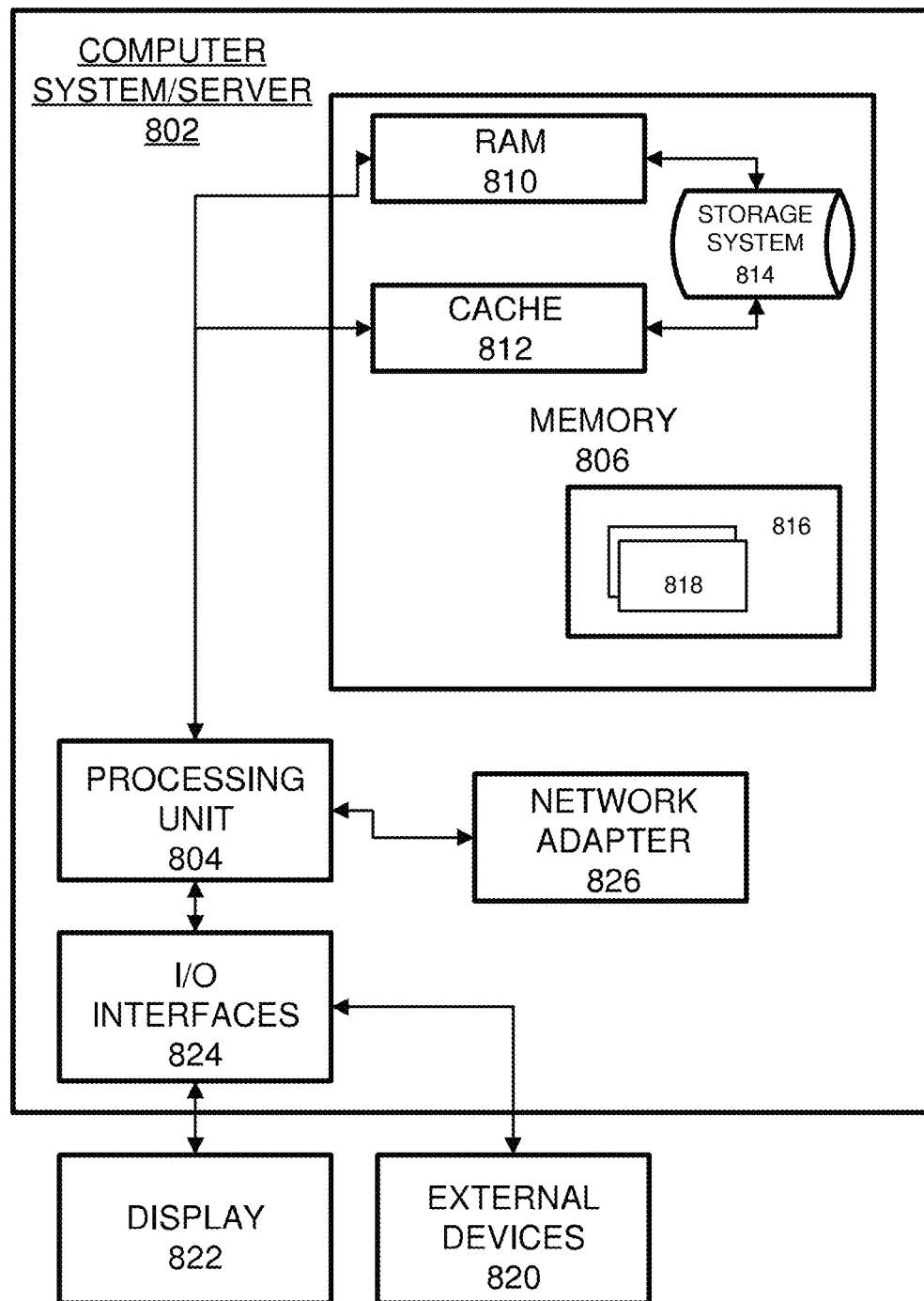
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server

802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
a storage device comprising a blockchain ledger that stores inventory data of a plurality of nodes within a supply chain; and
a processor configured to:
execute a blockchain consensus process, via a plurality of blockchain peers, for authorization of use of decision making logic, wherein the decision making logic is used for optimization of inventory among the plurality of nodes of the supply chain;
store the decision making logic within a blockchain smart contract on the blockchain ledger based on the execution of the blockchain consensus process is successful;
read, from the inventory data on the blockchain ledger, via a blockchain peer of the plurality of blockchain peers, a plurality of private views of a respective inventory of an item for the plurality of nodes of, respectively, wherein
the plurality of private views comprises a plurality of respective supply chain states, of the inventory of the item stored at the plurality of nodes, and a plurality of respective weights for a plurality of objective functions, and
the plurality of objective functions comprises minimization of global inventory, minimization of waste due to spoilage, and maximization of freshness of the item, respectively;
determine, by the blockchain smart contract, a global view of the inventory of the item from the plurality of respective supply chain states and the plurality of respective weights;
execute the decision making logic on the global view via the blockchain peer;
determine, by the blockchain smart contract, a quantity of the item from the inventory of each node of the plurality of nodes on the supply chain based on the global view of the inventory of the item, the plurality of respective weights, and the execution of the decision making logic, wherein
the determination of the quantity is further based on a weighted combination of each objective function of the plurality of objective functions;
transmit a recommendation with the quantity of the inventory of the item to each node of the plurality of nodes;
determine a first node of the plurality of nodes that affects a respective supply chain state, of the plurality of respective supply chain states, of a second node of the plurality of nodes as a reason for the recommendation, wherein the first node has a private view of the plurality of private views hidden from the second node;
add, by the blockchain smart contract, a blockchain transaction with the recommendation and the supply chain state of the determined first node therein to a data block;
commit the data block to the blockchain ledger; and
control access to the global view of the plurality of respective supply chain states among the plurality of nodes, without revealing specific sensitive individual information of the plurality of nodes, based on output of a partial view that includes an aggregate representation of the plurality of respective supply chain states.

2. The computing system of claim 1, wherein the global view of the inventory of the item comprises a current supply of the item associated with each node of the plurality of nodes, a freshness of the current supply of the item, and an expected demand for the current supply of the item.

3. The computing system of claim 1, wherein the processor is further configured to determine, to modify, a current inventory level of the item at a target node of the plurality of nodes, wherein the determination of the current inventory level is based on a network configuration of the plurality of nodes in the supply chain.

4. The computing system of claim 1, wherein the processor is further configured to determine, to modify, a current inventory level of the item at a target node of the plurality of nodes, wherein the determination of the current inventory level is based on:
a shelf life of the inventory of at least one node, of the plurality of nodes, different from the target node in the supply chain, and
latency values at one or more locations in the supply chain.

5. The computing system of claim 1, wherein the processor is further configured to determine, to modify, a current inventory level of the item at a target node of the plurality of nodes, wherein the determination of the current inventory level is based on current inventory levels of the item from at least one node of the plurality of nodes which is not visible to the target node.

6. The computing system of claim 1, wherein
the processor is further configured to reveal hidden current inventory data of a group of nodes of the plurality of nodes to a target node of the plurality of nodes when the group of nodes and the target node implements an echelon policy, and
the group of nodes is exclusive of the target node.

7. A method, comprising:
storing inventory data of a plurality of nodes of a supply chain on a blockchain ledger;
executing a blockchain consensus process, via a plurality of blockchain peers, for authorizing use of decision making logic, wherein the decision making logic is used for optimizing inventory among the plurality of nodes of the supply chain;

storing the decision making logic within a blockchain smart contract on the blockchain ledger based on the executing of the blockchain consensus process is successful;

reading, from the inventory data on the blockchain ledger, via a blockchain peer of the plurality of blockchain peers, a plurality of private views of a respective inventory of an item for the plurality of nodes, respectively, wherein the plurality of private views comprises a plurality of respective supply chain states, of the inventory of the item stored at the plurality of nodes, and a plurality of respective weights for a plurality of objective functions, and the plurality of objective functions comprises minimization of global inventory, minimization of waste due to spoilage, and maximization of freshness of the item, respectively;

determining, by the blockchain smart contract, a global view of the inventory of the item from the plurality of respective supply chain states and the plurality of respective weights;

executing the decision making logic on the global view via the blockchain peer;

determining, by the blockchain smart contract, a quantity of the item from the inventory of each node of the plurality of nodes on the supply chain based on the global view of the inventory of the item, the plurality of respective weights, and the executing of the decision making logic, wherein the determining of the quantity is further based on a weighted combination of each objective function of the plurality of objective functions;

transmitting a recommendation with the quantity of the inventory of the item to each node of the plurality of nodes;

determining a first node of the plurality of nodes that affects a respective a supply chain state, of the plurality of respective supply chain states, of a second node of the plurality of nodes as a reason for the recommendation, wherein the first node has a private view of the plurality of private views hidden from the second node;

adding, by the blockchain smart contract, a blockchain transaction with the recommendation and the supply chain state of the determined first node therein to a data block;

committing the data block to the blockchain ledger; and controlling access to the global view of the plurality of respective supply chain states among the plurality of nodes, without revealing specific sensitive individual information of the plurality of nodes, based on output of a partial view that includes an aggregate representation of the plurality of respective supply chain states.

8. The method of claim 7, wherein the global view of the inventory of the item comprises a current supply of the item associated with each node of the plurality of nodes, a freshness of the current supply of the item, and an expected demand for the current supply of the item.

9. The method of claim 7, wherein the determining further comprises determining, to modify, a current inventory level of the item at a target node of the plurality of nodes, wherein the determining of the current inventory level is based on a network configuration of the plurality of nodes in the supply chain.

10. The method of claim 7, wherein the determining further comprises determining, to modify, a current inventory level of the item at a target node of the plurality of nodes, wherein the determining of the current inventory level is based on:

a shelf life of the inventory of at least one node, of the plurality of nodes, different from the target node in the supply chain, and latency values at one or more locations in the supply chain.

11. The method of claim 7, wherein the determining further comprises determining, to modify, a current inventory level of the item at a target node of the plurality of nodes, wherein the determining of the current inventory level is based on current inventory levels of the item of at least one node of the plurality of nodes which is not visible to the target node.

12. The method of claim 7, wherein the method further comprises revealing hidden current inventory data of a group of nodes of the plurality of nodes to a target node of the plurality of nodes when the group of nodes and the target node implements an echelon policy, and the group of nodes is exclusive of the target node.

13. A non-transitory computer-readable medium comprising instructions which when executed by a processor cause the processor to perform operations, the operations comprising:

storing inventory data of a plurality of nodes of a supply chain on a blockchain ledger;

executing a blockchain consensus process, via a plurality of blockchain peers, for authorizing use of decision making logic, wherein the decision making logic is used for optimizing inventory among the plurality of nodes of the supply chain;

storing the decision making logic within a blockchain smart contract on the blockchain ledger based on the executing of the blockchain consensus process is successful;

reading, from the inventory data on the blockchain ledger, via a blockchain peer of the plurality of blockchain peers, a plurality of private views of a respective inventory of an item for the plurality of nodes, respectively, wherein the plurality of private views comprises a plurality of respective supply chain states of the inventory of the item stored at the plurality of nodes, and a plurality of respective weights for a plurality of objective functions, and the plurality of objective functions comprises minimization of global inventory, minimization of waste due to spoilage, and maximization of freshness of the item, respectively;

determining, by the blockchain smart contract, a global view of the inventory of the item from the plurality of respective supply chain states and the plurality of respective weights;

executing the decision making logic on the global view via the blockchain peer;

determining, by the blockchain smart contract, a quantity of the item from the inventory of each node of the plurality of nodes on the supply chain based on the global view of the inventory of the item, the plurality of respective weights, and the executing of the decision making logic, wherein the determining of the quantity is further based on a weighted combination of each objective function of the plurality of objective functions;

transmitting a recommendation with the quantity of the inventory of the item to each node of the plurality of nodes;

determining a first node of the plurality of nodes that affects a respective, a supply chain state, of the plurality of respective supply chain states, of a second node of the plurality of nodes as a reason for the recommendation, wherein the first node has a private view of the plurality of private views hidden from the second node;

adding, by the blockchain smart contract, a blockchain transaction with the recommendation and the supply chain state of the determined first node therein to a data block;

committing the data block to the blockchain ledger; and controlling access to the global view of the plurality of respective supply chain states among the plurality of nodes, without revealing specific sensitive individual information of the plurality of nodes, based on output of a partial view that includes an aggregate representation of the plurality of respective supply chain states.

14. The non-transitory computer-readable medium of claim 13, wherein the determining further comprises determining, to modify, a current inventory level of the item at a target node of the plurality of nodes, wherein the determining of the current inventory level is based on a network configuration of the plurality of nodes in the supply chain.

15. The non-transitory computer-readable medium of claim 13, wherein the determining further comprises determining, to modify, a current inventory level of the item at a target node of the plurality of nodes, wherein the determining of the current inventory level is based on latency values at one or more locations in the supply chain.

* * * * *